US008751074B2

(12) United States Patent
Porma

(10) Patent No.: US 8,751,074 B2
(45) Date of Patent: Jun. 10, 2014

(54) CONTROL OF INTERCONNECTED TROLLEYS

(75) Inventor: Mikko Porma, Vantaa (FI)

(73) Assignee: Konecranes PLC, Hyvinkaa (FI)

( * ) Notice: Subject to any disclaimer, the term of this patent is extended or adjusted under 35 U.S.C. 154(b) by 10 days.

(21) Appl. No.: 13/811,557

(22) PCT Filed: Jul. 21, 2011

(86) PCT No.: PCT/FI2011/050669

§ 371 (c)(1), (2), (4) Date: Jan. 22, 2013

(87) PCT Pub. No.: WO2012/017131

PCT Pub. Date: Feb. 9, 2012

(65) Prior Publication Data

US 2013/0118373 A1 May 16, 2013

(30) Foreign Application Priority Data

Aug. 5, 2010 (FI) ..................................... 20105838

(51) Int. Cl.
*G05D 1/00* (2006.01)

(52) U.S. Cl.
USPC .............................................. 701/20; 105/1.4

(58) Field of Classification Search
USPC .............................................. 701/20; 105/1.4
See application file for complete search history.

(56) References Cited

U.S. PATENT DOCUMENTS 8,428,796 B2 * 4/2013 Donnelly ........................ 701/19
2004/0130208 A1 7/2004 Muller et al.

FOREIGN PATENT DOCUMENTS

| | | | |
|---|---|---|---|
| EP | 0 829 449 | A2 | 3/1998 |
| EP | 1 897 838 | A2 | 3/2008 |
| JP | 51-126566 | | 10/1976 |
| JP | 7-277672 | A | 10/1995 |
| JP | 2009-57148 | A | 3/2009 |
| WO | WO 02/059033 | A1 | 8/2002 |

* cited by examiner

*Primary Examiner* — Thomas Black
*Assistant Examiner* — Luke Huynh
(74) *Attorney, Agent, or Firm* — Birch, Stewart, Kolasch & Birch, LLP

(57) ABSTRACT

A hoist trolley assembly includes first and second hoist trolleys, electric motors to drive the trolleys and a control system. The control system receives a preliminary speed reference for the trolleys and forms a final speed reference for the first hoist trolley by using initial data including the preliminary speed reference. The control system is adapted to use a hoist trolley coefficient $K_{rb}$ that is calculated by $$k_{rb} = \frac{T_{A\_nom}}{T_{B\_nom}} \cdot \frac{v_{B\_nom}}{v_{A\_nom}} \cdot \frac{m_{TB} + m_{LB}}{m_{TA} + m_{LA}},$$

wherein $T_{A\_nom}$=the rated torque of the electric motor of the first hoist trolley, $T_{B\_nom}$=the rated torque of the electric motor of the second hoist trolley, $v_{A\_nom}$=nominal speed of the first hoist trolley, $v_{B\_nom}$=nominal speed of the second hoist trolley, $m_{TA}$=dead weight of the first hoist trolley, $m_{TB}$=dead weight of the second hoist trolley $m_{LA}$=load of the first hoist trolley, and $m_{LB}$=load of the second hoist trolley.

9 Claims, 2 Drawing Sheets

CONTROL OF INTERCONNECTED TROLLEYS

BACKGROUND OF THE INVENTION

The invention relates to a hoist trolley assembly.

It is sometimes necessary to add to a hoist trolley assembly an auxiliary lifting apparatus with a faster lifting rate but a lower lifting capacity than that of the main lifting apparatus. One way of doing this is to place two lifting machines into the same hoist trolley. This is expensive and requires a special hoist trolley designed for two lifting machines. Alternatively, the auxiliary lifting apparatus may be placed in a separate hoist trolley with no drive equipment. This separate hoist trolley is then connected mechanically to the main hoist trolley. This solution is expensive and manufacturing-wise poor, because its implementation requires special parts designed exactly for this purpose. In addition, the order in which the main hoist trolley and the auxiliary hoist trolley without drive equipment are placed on their travel route affects the power supply implementation of the hoist trolleys that is difficult to alter.

The auxiliary lifting apparatus with a smaller lifting capacity may also be placed in a hoist trolley having its own drive equipment. A situation where the auxiliary hoist trolley carries a heavy load generates a problem in this arrangement. When the torques of the hoist trolley motors are of equal size, the friction of the main hoist trolley wheels is not necessarily enough, and they may start to slip. Slipping may damage both the wheel and the carrier of the wheel, which may be a rail, for instance. In addition any position measurement information is lost, if the position measurement sensor is connected to the slipping wheel.

BRIEF DESCRIPTION OF THE INVENTION

It is an object of the invention to provide a hoist trolley assembly comprising interconnected hoist trolleys equipped with their own drive equipment, in which the slipping problem of the hoist trolley wheels caused by unfavourable distribution of loads has been solved. The object of the invention is achieved by a hoist trolley assembly which is characterised by what is disclosed in the independent claims. Preferred embodiments of the invention are disclosed in the dependent claims.

The invention is based on the fact that the control system of the hoist trolley assembly is adapted to generate a final speed reference by utilising the rated torques of the electric motors of the hoist trolleys, the nominal speeds of the hoist trolleys, and the actual values of the total masses of the hoist trolleys.

The hoist trolley assembly of the invention provides the advantage that the hoist trolley wheels cannot slip even if the load was divided unevenly between the hoist trolleys.

BRIEF DESCRIPTION OF THE FIGURES

The invention will now be described in greater detail by means of preferred embodiments and with reference to the accompanying drawings, in which.

DETAILED DESCRIPTION OF THE INVENTION

Figure 1:
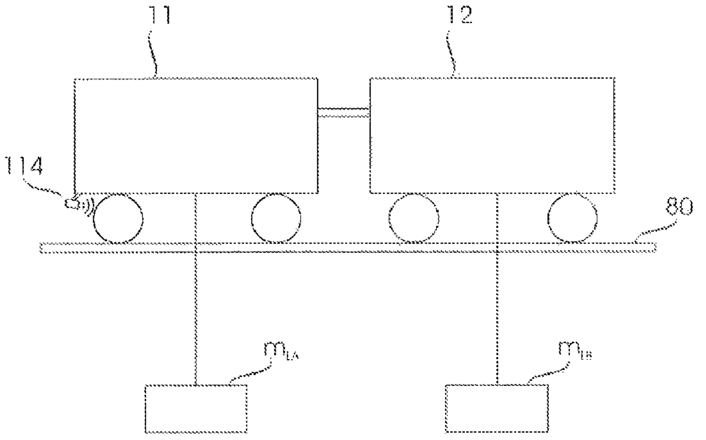
FIG. 1 shows interconnected hoist trolleys.

FIG. 1 shows a first hoist trolley 11 and a second hoist trolley 12 that are interconnected such that the first hoist trolley 11 and the second hoist trolley 12 are arranged to move at the same speed. The first hoist trolley 11 and the second hoist trolley 12 are arranged to move one after the other. The first hoist trolley 11 and the second hoist trolley 12 each comprise four wheels, by means of which the first hoist trolley 11 and the second hoist trolley 12 are arranged to move on rails 80. The dead weight of the first hoist trolley 11 is $m_{TA}$ and the load of the first hoist trolley 11 is $m_{LA}$. The dead weight of the second hoist trolley 12 is $m_{TB}$ and the load of the second hoist trolley 12 is $m_{LB}$.

Figure 2:
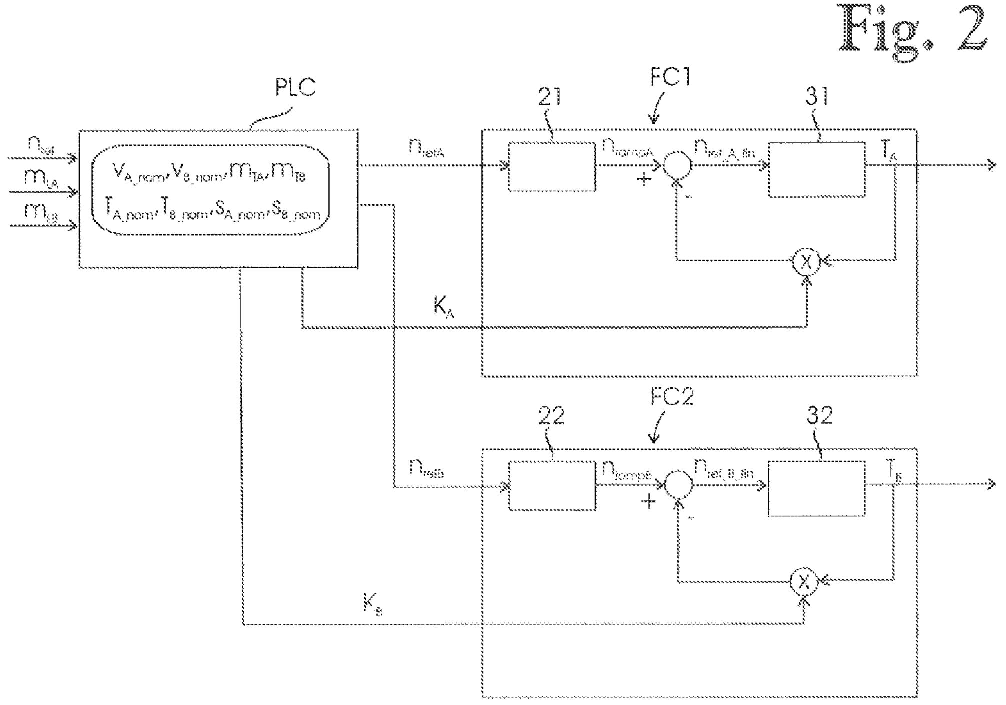
FIG. 2 is a diagram of the control system of a hoist trolley assembly according to an embodiment of the invention.

According to an embodiment of the invention, the hoist trolley assembly comprises the interconnected hoist trolleys according to FIG. 1, drive equipment for each connected hoist trolley, and the control system according to FIG. 2 that is arranged to control the drive equipment of each connected hoist trolley. The drive equipment of both the first hoist trolley 11 and the second hoist trolley 12 comprises an electric motor. The lifting capacity of the first hoist trolley 11 is substantially higher than that of the second hoist trolley 12. The lifting capacity of the first hoist trolley 11 may be 100 tons and that of the second hoist trolley 12 may be 20 tons, for example. The control system is arranged to receive information on the location of the interconnected hoist trolleys from a position measurement sensor 14 that is connected to a wheel of the first hoist trolley 11.

The control system of FIG. 2 comprises a programmable logic controller PLC, a first frequency converter FC1, and a second frequency converter FC2. The first frequency converter FC1 contains a first restriction block 21 and a first speed controller 31. The second frequency converter FC2 contains a second restriction block 22 and a second speed controller 32.

The programmable logic controller PLC is adapted to receive a preliminary speed reference $n_{ref}$ for the interconnected first 11 and second hoist trolley 12 as well as information on the load $m_{LA}$ of the first hoist trolley 11 and the load $m_{LB}$ of the second hoist trolley 12. The programmable logic controller PLC may be adapted to receive the preliminary speed reference $n_{ref}$ for instance from a user interface means, such as control lever that is arranged to be moved by an operator. Information on the load $m_{LA}$ of the first hoist trolley 11 and the load $m_{LB}$ of the second hoist trolley 12 may be received from corresponding load sensors, for instance.

The programmable logic controller PLC is also adapted to store information on the nominal speed $v_{A\_nom}$ of the first hoist trolley, the nominal speed $v_{B\_nom}$ of the second hoist trolley, the dead weight $m_{TA}$ of the first hoist trolley, the dead weight $m_{TB}$ of the second hoist trolley, the rated torque $T_{A\_nom}$ of the first hoist trolley electric motor, the rated torque $T_{B\_nom}$ of the second hoist trolley electric motor, the relative value $S_{A\_nom}$ of the nominal slip of the first hoist trolley electric motor, the relative value $S_{B\_nom}$ of the nominal slip of the second hoist trolley electric motor, this information comprising hoist trolley assembly-specific fixed values.

The programmable logic controller PLC is adapted to define a preliminary speed reference $n_{refA}$ of the first hoist trolley on the basis of the nominal speed $v_{A\_nom}$ of the first hoist trolley, the nominal speed $v_{B\_nom}$ of the second hoist trolley and the preliminary speed reference $n_{ref}$ by using the equation $$n_{refA} = \frac{\min(v_{A\_nom}, v_{B\_nom})}{v_{A\_nom}} \cdot n_{ref},$$

wherein "min ( )" is a function that returns the lowest of initial values. Correspondingly, the programmable logic controller PLC is adapted to define a preliminary speed reference $n_{refB}$ of the second hoist trolley by using the equation $$n_{refB} = \frac{\min(v_{A\_nom}, v_{B\_nom})}{v_{B\_nom}} \cdot n_{ref}.$$

In addition to the preliminary speed references $n_{refA}$ and $n_{refB}$, the programmable logic controller PLC is adapted to define a load flex coefficient $K_A$ for the first hoist trolley. The load flex coefficient $K_B$ of the second hoist trolley may be freely selected to be 0.02, i.e. 2%, for example. The load flex coefficient $K_B$ of the second hoist trolley may be a fixed value stored in the programmable logic controller, or it may be a variable, the value of which may be changed by the user. The load flex coefficient $K_A$ of the first hoist trolley is defined by $$K_A = k_{rb} \cdot K_B,$$

wherein $k_{rb}$ is a hoist trolley coefficient obtained from $$k_{rb} = \frac{T_{A\_nom}}{T_{B\_nom}} \cdot \frac{v_{B\_nom}}{v_{A\_nom}} \cdot \frac{m_{TB} + m_{LB}}{m_{TA} + m_{LA}}.$$

The first restriction block 21 of the first frequency converter FC1 is adapted to form a restricted speed reference $n_{rampA}$ for the first hoist trolley by restricting the first time derivative of the preliminary speed reference $n_{refA}$ of the first hoist trolley at its maximum to an acceleration value $a_{rampA}$ of the first restriction block.

The input signal of the first speed controller 31 is the final speed reference $n_{ref\_A\_fin}$ for the first hoist trolley 11. On the basis of its input signal, the first speed controller 31 forms the actual value $T_A$ of the first hoist trolley electric motor torque. The control system is adapted to form a final speed reference $n_{ref\_A\_fin}$ for the first hoist trolley 11 by using the equation $$n_{ref\_A\_fin} = n_{rampA} - k_{rb} \cdot K_B \cdot T_A,$$

that may also be expressed as $$n_{ref\_A\_fin} = n_{rampA} - K_A \cdot T_A.$$

In accordance with the above equation, the first frequency converter FC1 comprises a feedback loop. The output signal $T_A$ of the first speed controller 31, which is also the first output signal of the frequency converter FC1, is fed back in such a manner that the actual value $T_A$ of the first hoist trolley electric motor torque is utilized in forming the final speed reference $n_{ref\_A\_fin}$ of the first hoist trolley.

The second frequency converter FC2 operates in a corresponding manner as the first frequency converter FC1. The second frequency converter FC2 is adapted to form the actual value $T_B$ of the second hoist trolley electric motor torque by using as input data the load flex coefficient $K_B$ and preliminary speed reference $n_{refB}$ of the second hoist trolley.

The second restriction block 22 is adapted to form a restricted speed reference $n_{rampB}$ for the second hoist trolley by restricting the first time derivative of the preliminary speed reference $n_{refB}$ of the second hoist trolley at its maximum to an acceleration value $a_{rampB}$ of the second restriction block. The input signal of the second speed controller 32 is the final speed reference $n_{ref\_B\_fin}$ for the second hoist trolley 12, and the output signal of the second speed controller 32 is the actual value $T_B$ of the second hoist trolley 12 electric motor torque. The control system is adapted to form a final speed reference $n_{ref\_B\_fin}$ for the second hoist trolley 12 by using the equation $$n_{ref\_B\_fin} = n_{rampB} - K_B \cdot T_B,$$

that is, the second frequency converter FC2 comprises a feedback loop in the same manner as the first frequency converter FC1.

In an embodiment of the invention, the acceleration value $a_{rampA}$ of the first restriction block is substantially equal to the acceleration value $a_{rampB}$ of the second restriction block. In an alternative embodiment, the acceleration value $a_{rampA}$ of the first restriction block is dependent on the acceleration value $a_{rampB}$ of the second restriction block as shown in the equation below.

$$a_{rampA} = \frac{\min(v_A, v_B)}{v_A} \cdot a_{rampB}$$

Figure 3:
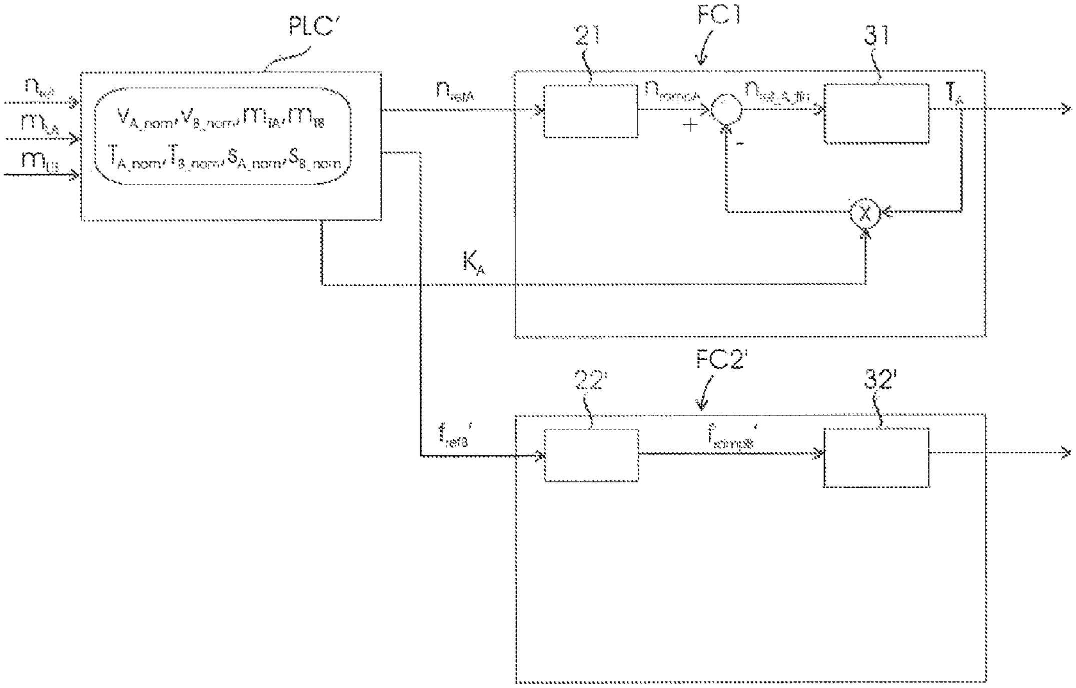
FIG. 3 is a diagram of the control system of a hoist trolley assembly according to another embodiment of the invention.

FIG. 3 is a diagram of the control system of a hoist trolley assembly according to an alternative embodiment of the invention. The control system of FIG. 3 differs from that of FIG. 2 in that the second frequency converter FC2' does not have a feedback loop, that is, the control circuit of the second frequency converter FC2' is an open circuit. In FIG. 3, the features that differ from the control system of FIG. 2 are marked with reference numbers equipped with an apostrophe (').

The programmable logic controller PLC' is adapted to define a preliminary frequency reference $f_{refB}'$ of the second hoist trolley. The second restriction block 22' is adapted to form a restricted frequency reference $f_{rampB}'$ for the second hoist trolley by restricting the first time derivative of the preliminary frequency reference $f_{refB}'$ of the second hoist trolley at its maximum to an acceleration value $a'_{rampB}$ of the second restriction block. The restricted frequency reference $f_{rampB}'$ of the second hoist trolley is an input signal of an open circuit controller 32'.

It is obvious to a person skilled in the art that the basic idea of the invention may be implemented in many different ways. The invention and its embodiments are thus not restricted to the examples described above but may vary within the scope of the claims.

The invention claimed is:

1. A hoist trolley assembly that comprises a first hoist trolley, drive equipment for the first hoist trolley, a second hoist trolley, drive equipment for the second hoist trolley, and a control system, the first hoist trolley being connected to the second hoist trolley in such a manner that the first hoist trolley and the second hoist trolley are arranged to move at the same speed, both the drive equipment of the first hoist trolley and the drive equipment of the second hoist trolley comprising an electric motor, the control system being adapted to receive a preliminary speed reference for the interconnected first hoist trolley and second hoist trolley and to form a final speed reference for the first hoist trolley by using initial data that comprise the preliminary speed reference, wherein the control system is adapted to use in forming the final speed reference for the first hoist trolley a hoist trolley coefficient $k_{rb}$ that is calculated by $$k_{rb} = \frac{T_{A\_nom}}{T_{B\_nom}} \cdot \frac{v_{B\_nom}}{v_{A\_nom}} \cdot \frac{m_{TB} + m_{LB}}{m_{TA} + m_{LA}}, \text{ wherein}$$

$T_{A\_nom}$=the rated torque of the electric motor of the first hoist trolley $T_{B\_nom}$=the rated torque of the electric motor of the second hoist trolley $v_{A\_nom}$=nominal speed of the first hoist trolley $v_{B\_nom}$=nominal speed of the second hoist trolley $m_{TA}$=dead weight of the first hoist trolley $m_{TB}$=dead weight of the second hoist trolley $m_{LA}$=load of the first hoist trolley $m_{LB}$=load of the second hoist trolley.

2. A hoist trolley assembly as claimed in claim 1, wherein the control system comprises a programmable logic controller and a first restriction block, the programmable logic controller being adapted to form a preliminary speed reference $n_{refA}$ for the first hoist trolley by using the following equation $$n_{refA} = \frac{\min(v_A, v_B)}{v_A} \cdot n_{ref},$$

the first restriction block being adapted to form a restricted speed reference $n_{rampA}$ for the first hoist trolley by restricting the first time derivative of the preliminary speed reference $n_{refA}$ of the first hoist trolley at its maximum to an acceleration value $a_{rampA}$ of the first restriction block.

3. A hoist trolley assembly as claimed in claim 2, wherein the programmable logic controller is also adapted to form a preliminary speed reference $n_{refB}$ for the second hoist trolley by using the following equation $$n_{refB} = \frac{\min(v_A, v_B)}{v_B} \cdot n_{ref}, \text{ and}$$

the control system also comprises a second restriction block that is adapted to form a restricted speed reference $n_{rampB}$ for the second hoist trolley by restricting the first time derivative of the preliminary speed reference $n_{refB}$ of the second hoist trolley at its maximum to an acceleration value $a_{rampB}$ of the second restriction block.

4. A hoist trolley assembly as claimed in claim 3, wherein the acceleration value $a_{rampA}$ of the first restriction block is substantially equal to the acceleration value $a_{rampB}$ of the second restriction block.

5. A hoist trolley assembly as claimed in claim 2, wherein the control system is adapted to form a final speed reference $n_{ref\_A\_fin}$ for the first hoist trolley by using the equation $$n_{ref\_A\_fin} = n_{rampA} - k_{rb} \cdot K_B \cdot T_A, \text{ wherein}$$

$n_{rampA}$=restricted speed reference of the first hoist trolley $k_{rb}$=hoist trolley coefficient $K_B$=load flex coefficient of the second hoist trolley $T_A$=actual value of the first hoist trolley electric motor torque.

6. A hoist trolley assembly as claimed in claim 2, wherein the control system is adapted to form a final speed reference $n_{ref\_A\_fin}$ for the first hoist trolley by using the equation $$n_{ref\_A\_fin} = n_{rampA} - k_{rb} \cdot s_B \cdot T_A, \text{ wherein}$$

$n_{rampA}$=restricted speed reference of the first hoist trolley $k_{rb}$=hoist trolley coefficient $s_B$=nominal slip of the second hoist trolley short-circuit motor as a relative value $T_A$=actual value of the first hoist trolley electric motor torque.

7. A hoist trolley assembly as claimed in claim 1, wherein the hoist trolley assembly also comprises a position measurement sensor that is connected to at least one wheel of the first hoist trolley and adapted to transmit data on the position of the interconnected hoist trolleys to the control system.

8. A hoist trolley assembly as claimed in claim 1, wherein the lifting capacity of the first hoist trolley is substantially higher than that of the second hoist trolley.

9. A hoist trolley assembly that comprises a first hoist trolley, drive equipment for the first hoist trolley, a second hoist trolley, drive equipment for the second hoist trolley, and a control system, the first hoist trolley being connected to the second hoist trolley in such a manner that the first hoist trolley and the second hoist trolley are arranged to move at the same speed, both the drive equipment of the first hoist trolley and the drive equipment of the second hoist trolley comprising an electric motor, the control system being adapted to receive a preliminary speed reference for the interconnected first hoist trolley and second hoist trolley and to form a final speed reference for the first hoist trolley by using initial data that comprise the preliminary speed reference, wherein the control system is adapted to use in forming the final speed reference for the first hoist trolley a hoist trolley coefficient $k_{rb}$ that is obtainable by an equation $$k_{rb} = \frac{T_{A\_nom}}{T_{B\_nom}} \cdot \frac{v_{B\_nom}}{v_{A\_nom}} \cdot \frac{m_{TB} + m_{LB}}{m_{TA} + m_{LA}}, \text{ wherein}$$

$T_{A\_nom}$=the rated torque of the electric motor of the first hoist trolley $T_{B\_nom}$=the rated torque of the electric motor of the second hoist trolley $v_{A\_nom}$=nominal speed of the first hoist trolley $v_{B\_nom}$=nominal speed of the second hoist trolley $m_{TA}$=dead weight of the first hoist trolley $m_{TB}$=dead weight of the second hoist trolley $m_{LA}$=load of the first hoist trolley $m_{LB}$=load of the second hoist trolley, and the control system comprises a programmable logic controller and a first restriction block, the programmable logic controller being adapted to form a preliminary speed reference $n_{refA}$ for the first hoist trolley, the preliminary speed reference being obtainable by an equation $$n_{refA} = \frac{\min(v_A, v_B)}{v_A} \cdot n_{ref},$$

the first restriction block being adapted to form a restricted speed reference $n_{rampA}$ for the first hoist trolley by restricting the first time derivative of the preliminary speed reference $n_{refA}$ of the first hoist trolley at its maximum to an acceleration value $a_{rampA}$ of the first restriction block.

* * * * *